United States Patent
Yoshizuka et al.

(10) Patent No.: US 11,631,268 B2
(45) Date of Patent: Apr. 18, 2023

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Masanori Yoshizuka, Kanagawa (JP); Junichi Shimizu, Kanagawa (JP); Shigeru Okada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 491 days.

(21) Appl. No.: 16/831,066

(22) Filed: Mar. 26, 2020

(65) Prior Publication Data
US 2021/0089766 A1 Mar. 25, 2021

(30) Foreign Application Priority Data
Sep. 20, 2019 (JP) .............. JP2019-171439

(51) Int. Cl.
| | | |
|---|---|---|
| *G06F 17/00* | (2019.01) | |
| *G06V 30/414* | (2022.01) | |
| *G06F 40/30* | (2020.01) | |
| *G06V 30/416* | (2022.01) | |

(52) U.S. Cl.
CPC ............ *G06V 30/414* (2022.01); *G06F 40/30* (2020.01); *G06V 30/416* (2022.01)

(58) Field of Classification Search
CPC .. G06V 30/414; G06V 30/416; G06V 20/635; G06V 30/268; G06V 30/10; G06F 40/30; G06F 40/295; G06F 40/284
See application file for complete search history.

(56) References Cited

U.S. PATENT DOCUMENTS

| | | | | |
|---|---|---|---|---|
| 6,963,665 | B1 | 11/2005 | Imaizumi et al. | |
| 7,251,434 | B2* | 7/2007 | Ikeda | G03G 15/168 399/349 |
| 7,478,089 | B2* | 1/2009 | Henkin | G06Q 50/12 707/999.005 |
| 9,449,080 | B1* | 9/2016 | Zhang | G06F 16/3346 |
| 11,424,020 | B2* | 8/2022 | Wisser | G16H 10/60 |
| 2005/0154971 | A1* | 7/2005 | Nagao | G06F 40/268 715/233 |
| 2006/0206464 | A1* | 9/2006 | Marukawa | G06F 40/117 |
| 2013/0198084 | A1* | 8/2013 | Agarwal | G06F 40/154 705/44 |
| 2016/0117293 | A1* | 4/2016 | Dettman | G06F 40/143 715/234 |
| 2019/0056912 | A1* | 2/2019 | Eyigoz | G06F 40/211 |

FOREIGN PATENT DOCUMENTS

| | | |
|---|---|---|
| JP | 2001-202466 A | 7/2001 |
| JP | 2013-142955 A | 7/2013 |

* cited by examiner

*Primary Examiner* — Laurie A Ries
(74) *Attorney, Agent, or Firm* — Oliff PLC

(57) ABSTRACT

An information processing apparatus includes a processor programmed to: extract from a document a proper noun that is likely to represent a provider of the document or a receiver of the document; and determine whether an attribute of the proper noun is the provider or the receiver by referring to information obtained from the proper noun or information obtained from a vicinity of the proper noun on the document.

13 Claims, 7 Drawing Sheets

| USER ID | PASSWORD | USER NAME | COMPANY NAME |
|---|---|---|---|
| user_A | aaaaa | USER A | XYZ INCORPORATED |
| user_B | bbbbb | USER B | ABC INCORPORATED |
| ▪ | | | |
| ▪ | | | |
| ▪ | | | |

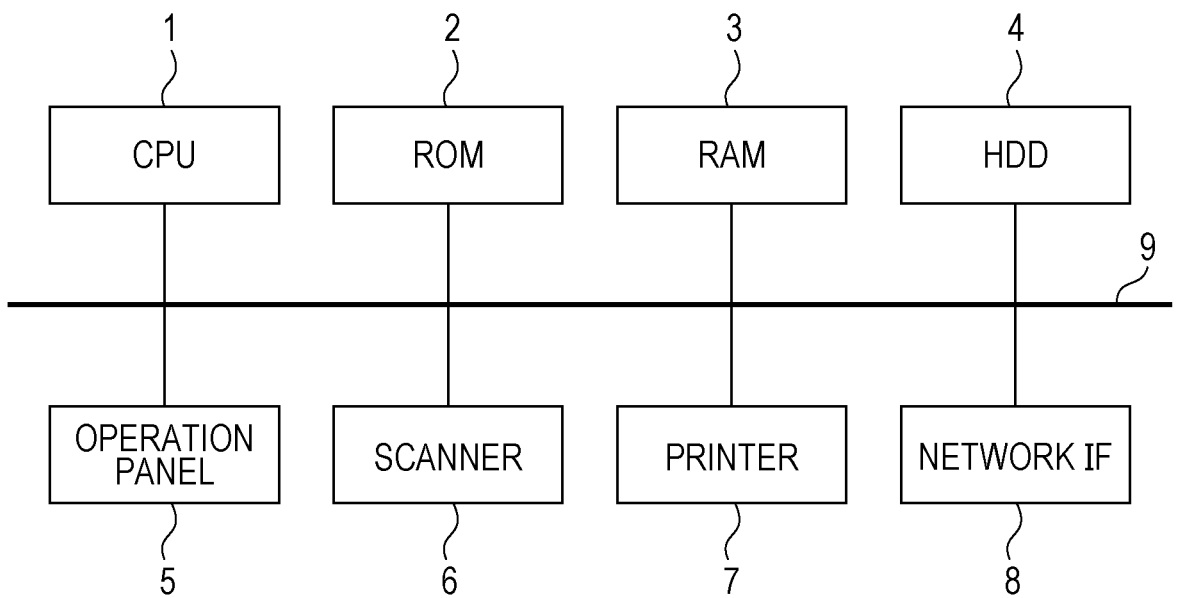

FIG. 5

INVOICE

TO: ABC Incorporated

For the attention of Mr. YAMADA Taro

Billing No.: 20190901-001
Billing date: September 1, 2019

XYZ Incorporated         XYZ Incorporated — 31

Address: XXXXXXXXXX
TEL: 012-345-6987
FAX: 012-345-6789
Contact personnel: YAMADA Hanako Subject: device installation Please be advised that your payment to be made as follows.

Billing amount (consumption tax included)
¥ 10,000

FIG. 6

| FORM ID | FORM TYPE | ISSUER | RECEIVER |
|---|---|---|---|
| f001 | INVOICE | XYZ INCORPORATED | ABC INCORPORATED |
| f002 | ESTIMATE | XYZ INCORPORATED | ABC INCORPORATED |
| ⋮ | | | |

FIG. 7

ESTIMATE

September 1, 2019

Estimate No.: W98765

TO: ABC Incorporated

Your estimate request No.: D01234

Subject: estimate for device installation

We are pleased to provide you the estimated cost as follows.

Total amount (consumption tax included)
¥10,000

Payment conditions: month-end closing, payment for a month after next
Estimate expiration date: September 30, 2019

XYZ Incorporated
Address: XXXXXXXXX
TEL: 012-345-6987
FAX: 012-345-6789
Contact personnel: YAMADA Hanako

32

33

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-171439 filed Sep. 20, 2019.

BACKGROUND

(i) Technical Field

The present disclosure relates to an information processing apparatus and a non-transitory computer readable medium.

(ii) Related Art

Nowadays, forms, such as invoices and cost estimates, are processed in the following manner. A form is scanned to generate a read image. The read image is then subjected to optical character recognition (OCR) processing, and the content described in the form is analyzed to identify the type of form, such as an invoice or a cost estimate. Information is then automatically extracted from the read image in accordance with the identified type of form. For example, if the type of form is an invoice, items of information, such as the billing amount and the payment due date, are automatically extracted. Then, the extracted items of information are formed into a database or are used to execute processing in accordance with the type of form. Examples of the related art are disclosed in Japanese Unexamined Patent Application Publication Nos. 2001-202466 and 2013-142955.

SUMMARY

A user may process a document differently depending on whether the user or the user's company is a provider or a receiver of this document. It is thus desirable to automatically determine from a document whether a user or a user's company is a provider or a receiver of this document.

Aspects of non-limiting embodiments of the present disclosure relate to an information processing apparatus and a non-transitory computer readable medium that are able to determine whether a proper noun extracted from a document represents a provider or a receiver of this document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor programmed to: extract from a document a proper noun that is likely to represent a provider of the document or a receiver of the document; and determine whether an attribute of the proper noun is the provider or the receiver by referring to information obtained from the proper noun or information obtained from a vicinity of the proper noun on the document.

BRIEF DESCRIPTION OF THE DRAWINGS

An exemplary embodiment of the present disclosure will be described in detail based on the following figures, wherein:

FIG. 2 is a block diagram of the hardware configuration of the image forming apparatus;

FIG. 3 illustrates an example of the data structure of user information registered in a user information database in the exemplary embodiment;

FIG. 5 illustrates an example of a form handled in the exemplary embodiment;

FIG. 6 illustrates an example of the data structure of form information stored in a form information storage;

FIG. 7 illustrates another example of a form handled in the exemplary embodiment.

DETAILED DESCRIPTION

An exemplary embodiment of the disclosure will be described below with reference to the accompanying drawings. In this exemplary embodiment, a form sent and received between companies will be discussed as an example of a document.

Figure 1:
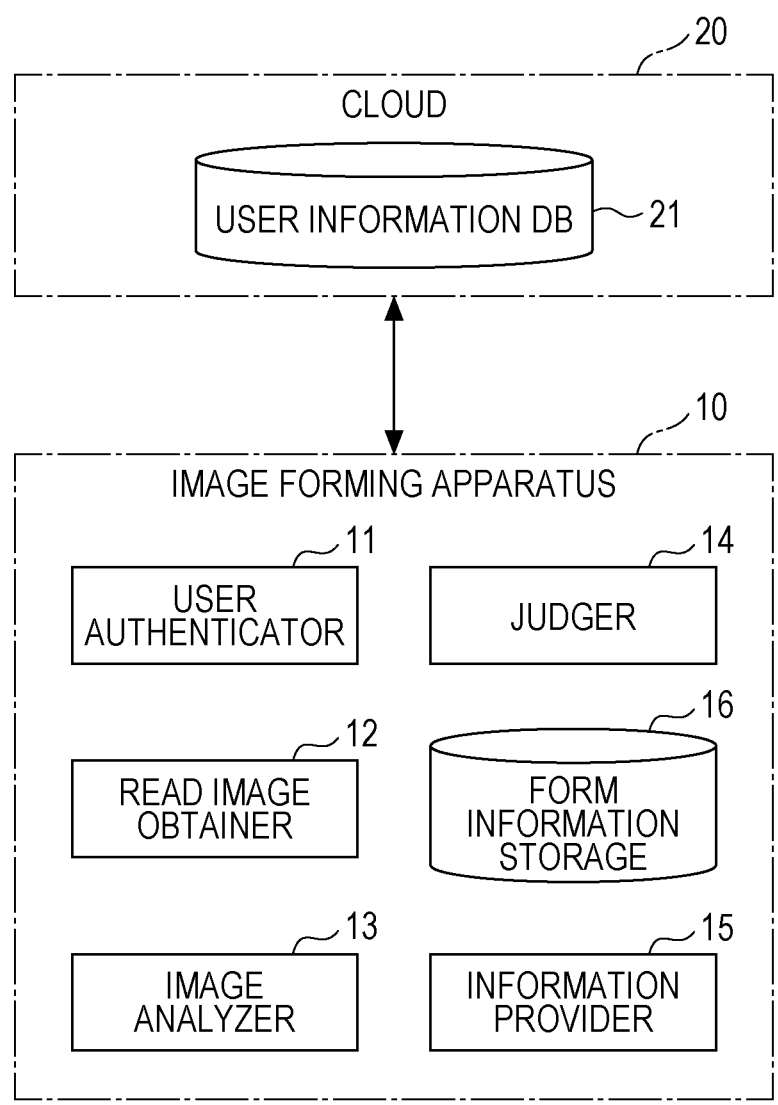
FIG. 1 is a block diagram of an image forming apparatus according to the exemplary embodiment.

FIG. 1 is a block diagram of an image forming apparatus 10 according to the exemplary embodiment. FIG. 2 is a block diagram of the hardware configuration of the image forming apparatus 10. The image forming apparatus 10 is a multifunction device having various functions, such as a copy function and a scan function, and including an information processing apparatus according to an exemplary embodiment of the disclosure. In the image forming apparatus 10 shown in FIG. 2, a read only memory (ROM) 2 stores various programs for controlling the image forming apparatus 10 and for implementing a distinctive processing function of the exemplary embodiment, which will be discussed later. A central processing unit (CPU) 1 controls the operations of various mechanisms, such as a scanner 6 and a printer 7, installed in the image forming apparatus 10 in accordance with the programs stored in the ROM 2. A random access memory (RAM) 3 is used as a work memory for the CPU 1 to execute the programs and as a communication buffer for sending and receiving digital data. A hard disk drive (HDD) 4 stores digital documents, for example, read by the scanner 6. An operation panel 5 receives an instruction from a user and displays information. The scanner 6 reads a document set by a user and stores the read document in the HDD 4, for example, as a digital document. A printer 7 prints an image on an output sheet in accordance with an instruction from a control program executed by the CPU 1. A network interface (IF) 8, which connects to a network, is used for sending and receiving data to and from external devices, such as a cloud 20, and for allowing external devices to make access to the image forming apparatus 10 via a browser. An address data bus 9 connects to the various mechanisms controlled by the CPU 1 and performs data communication with them.

As shown in FIG. 1, the cloud 20 is connected to the image forming apparatus 10 so that they can communicate with each other via a network (not shown), such as the Internet. The image forming apparatus 10 includes a user authenticator 11, a read image obtainer 12, an image analyzer 13, a judger 14, an information provider 15, and a form information storage 16. The elements of the image forming apparatus 10 that are not discussed in the exemplary embodiment are not shown.

The user authenticator 11 authenticates a user using the image forming apparatus 10 and also identifies the company to which the user belongs. The read image obtainer 12 obtains a read image of a form read by the scanner 6. The image analyzer 13 analyzes the read image obtained by the read image obtainer 12 and extracts a character string and an image included in the form. In this exemplary embodiment, as an image of the form, the image analyzer 13 detects and extracts a seal impression (a stamp used on an official document instead of a signature). The judger 14 judges whether the company of the authenticated user is a provider or a receiver of the form. The judger 14 then stores form information indicating a judging result and other items of information in the form information storage 16. The information provider 15 provides the form information to the user or the cloud 20.

The cloud 20, which is also called cloud computing, is also defined as the generic term of on-demand services for providing various resources, such as computing, databases, storages, and applications, via the Internet. The cloud 20 in this exemplary embodiment includes a user information database 21 and conducts user authentication in response to a request from the image forming apparatus 10. The cloud 20 may also provide the execution of postprocessing on a form read by the image forming apparatus 10 in response to a request from a company.

FIG. 3 illustrates an example of the data structure of user information registered in the user information database 21 in the exemplary embodiment. As the user information, information concerning users using the cloud 20 including a user of the image forming apparatus 10 is set. As shown in FIG. 3, the user information indicates a user ID, which is identification information for identifying a user, a password necessary for user authentication, a user name, and a company name to which a user belongs. The password, user name, and company name are associated with each user ID. Although FIG. 3 shows information only related to the exemplary embodiment, another item of information may be included in the user information.

The user authenticator 11, the read image obtainer 12, the image analyzer 13, the judger 14, and the information provider 15 of the image forming apparatus 10 are implemented by collaborative work between a computer installed in the image forming apparatus 10 and a program executed by the CPU 1 of the computer. The form information storage 16 is implemented by the HDD 4 of the image forming apparatus 10. Instead of the form information storage 16, the RAM 3 may be used or an external storage may be used via a network.

The programs used in the exemplary embodiment may be provided as a result of being stored in a computer readable recording medium, such as a compact disc (CD)-ROM or a universal serial bus (USB) memory, as well as being provided by a communication medium. As a result of the programs provided by a communication medium or a recording medium being installed into a computer and being sequentially executed by the CPU 1 of the computer, various operations can be executed.

Processing for judging whether the company of an authenticated user is a provider or a receiver of a form will now be described below with reference to the flowchart of FIG. 4.

In step S101, when a user has input a user ID and a password of the user on a predetermined screen displayed on the operation panel 5 of the image forming apparatus 10, the user authenticator 11 sends the user ID and the password to the cloud 20 so as to conduct user authentication. Upon receiving the user ID and the password, the cloud 20 checks the received user ID and password against information registered in the user information database 21 so as to conduct user authentication. If user authentication has succeeded, the cloud 20 returns the name of the company to which the user belongs. In this manner, the user authenticator 11 obtains the name of the company of the user in step S102 when conducting user authentication. In the following description, the company to which an authenticated user belongs will be called the company of the authenticated user. The name of the company obtained by an authenticated user will be called the company name of the authenticated user.

After the user has been authenticated, the scanner 6 reads a form. As a result, the read image obtainer 12 obtains the read image of the form in step S103.

Then, in step S104, the image analyzer 13 analyzes the read image to obtain certain information. More specifically, the image analyzer 13 extracts a character string from the read image of the form by using optical character recognition (OCR) technology. In this exemplary embodiment, the image analyzer 13 extracts at least an honorific or a word accompanying an addressee, which will be discussed later, and a proper noun that may represent a provider or a receiver of a form. A character string is a set of characters, and only one character may form a set of characters.

A proper noun is a unique entity, as distinguished from other entities belonging to the same type of noun, such as a person name, a place name, a country name, a book name, a song name, a company name, and an organization name. In this exemplary embodiment, a proper noun that may represent a provider or a receiver of a form refers to a proper noun that may be identified as a provider of a form (that is, an issuer of a form) or a receiver of a form (that is, an addressee of a form), such as a person name, a company name, and an organization name. In this exemplary embodiment, a company name will be taken as an example of a proper noun that may represent a provider or a receiver of a form.

The judger 14 then refers to the analysis result of the read image of the form obtained by the image analyzer 13 and judges in step S105 whether a character string representing an honorific or a word accompanying an addressee has been extracted from the read image of the form. An honorific is a title appended to an addressee, such as "Mr." and "Ms.", usually added to the name of contact personnel, who is a receiver of a form. A word accompanying an addressee is a word added prior to an addressee, such as "To", and usually appended to a company name, which is a receiver of a form.

If an honorific or a word accompanying an addressee has been extracted from the read image of the form (YES in step S105), the judger 14 extracts the company name of the authenticated user from the read image and then judges in step S106 whether the honorific or the word accompanying an addressee is disposed near the extracted company name. If the honorific or the word accompanying an addressee is disposed near the extracted company name (YES in step S106), the judger 14 determines that the word or the honorific is appended to the company name of the authenticated user or contact personnel in the company of the authenticated user. The judger 14 then judges that the company of the authenticated user is a receiver of the form in step S110.

The company name of the authenticated user has been obtained in step S102. It is assumed that the company name obtained in step S102 is "ABC Incorporated". The abbreviated form "Inc." may also be used instead of "Incorporated". In this exemplary embodiment, such orthographical variants (words spelled differently but having the same meaning) can be handled by using an existing technology. That is, the judger 14 is able to identify "ABC Inc." as the company name of the authenticated user.

FIG. 5 illustrates an example of a form handled in the exemplary embodiment. In this example of the form, if the company name of the authenticated user is "ABC Incorporated" as described above, it is found that the word accompanying an addressee "TO" is added before "ABC Incorporated" and that the honorific "Mr." is added to the name of the contact personnel "YAMADA Taro" within this company. Based on at least one of these two items of information, the judger 14 determines that the company of the authenticated user is a receiver of this form.

As in this example, an honorific or a word accompanying an addressee is normally added to a receiver of a form. If a word accompanying an addressee or an honorific is not appended to the company name of the authenticated user or to contact personnel in the company (NO in step S106), the judger 14 determines that the company of the authenticated user is an issuer of the form in step S111.

If an honorific or a word accompanying an addressee has failed to be extracted from the read image of the form for some reason, for example, because of a low accuracy of reading (NO in step S105), the judger 14 detects a seal impression from the read image of the form in step S107. Alternatively, the image of a seal impression may be extracted together with a character string in step S104. Then, in step S108, the judger 14 identifies a company name placed next to the detected image of the seal impression from among the company names extracted from the read image in step S104. This operation is executed based on the assumption that a company, which issues a form, normally places a seal impression of the company next to the company name on the form. On the form, plural company names, that is, the name of a provider of the form and the name of a receiver of the form, are described. The judger 14 thus extracts the company name located next to the image of the seal impression. If the extracted company name is the company name of the authenticated user (YES in step S109), the judger 14 determines that the company of the authenticated user is an issuer of the form in step S111. If the extracted company name is not the company name of the authenticated user (NO in step S109), the judger 14 determines that the company of the authenticated user is a receiver of the form in step S110.

It is now assumed that the company name of the authenticated user is "XYZ Incorporated". In the example of the form shown in FIG. 5, "ABC Incorporated" and "XYZ Incorporated" are extracted as the company names. Character strings extracted from the read image of a form include character strings suggesting that they are company names, such as "Incorporated", "Inc.", and "Co., Ltd". "ABC Incorporated" and "XYZ Incorporated" can thus be identified as character strings representing company names. In the example of the form in FIG. 5, the company name of the authenticated user, that is, "XYZ Incorporated", is located next to a seal impression 31 detected from the read image of the form. The judger 14 thus determines that the company of the authenticated user is an issuer of the form in FIG. 5. An existing technology may be used to verify that the seal impression 31 is a seal of "XYZ Incorporated". Then, even if multiple seal impressions are included in the read image of the form, the company of the seal impression 31 can be identified.

As described above, in this exemplary embodiment, when a user is authenticated, the company name of the authenticated user is obtained and is later identified from the read image of a form. Then, based on information obtained from the vicinity of the identified company name and the positional relationship of this company name to an honorific or a word accompanying an addressee or a seal impression, it is possible to judge whether the company of the authenticated user is an issuer or a receiver of the form.

However, there may be a case in which a canceling mark is added to an honorific or a word appended to a receiver of a form. A canceling mark, which is typically a mark overlapping an honorific or a word appended to an addressee, may be strikethrough, double strikethrough, filling, or a canceling stamp. Even if a canceling mark is superposed on an honorific or a word accompanying an addressee, the honorific or the word still needs identifying by using the OCR technology. A company name once recognized as a receiver of a form is changed to an issuer if an honorific or a word appended to an addressee is deleted with a canceling mark. In this case, the judger 14 determines that this company is a provider of the form.

In the exemplary embodiment described above, an honorific or a word accompanying an addressee is first extracted from the read image of the form, and then, a seal impression is detected. However, a seal impression may be detected first. A determination as to whether the company name of the authenticated user is an issuer or a receiver of the form may be made in the following manner. In the exemplary embodiment, an honorific or a word accompanying an addressee or a seal impression is extracted first, and then, it is determined whether the company name of the authenticated user is disposed near the extracted item of information. However, the company name of the authenticated user obtained in step S102 may be checked against the character strings extracted from the read image of the form so as to identify the position of the company name of the authenticated user first. The judger 14 may then determine whether an honorific or a word accompanying an addressee or a seal impression is disposed near the identified company name of the authenticated user.

In the exemplary embodiment described above, it is determined whether the company of the authenticated user is an issuer or a receiver of the form without referring to the company having sent or received the form to or from the company of the authenticated user. As a result of checking the character strings extracted from the form against the company names registered in the user information database 21 of the cloud 20, the company names described in the form can be determined. If only one company name other than the company name of the authenticated user is extracted from the read image of the form, this company is found to be the receiver of the form if the company of the authenticated user is the issuer, and is found to be the issuer of the form if the company of the authenticated user is the receiver.

In the exemplary embodiment described above, the issuer and the receiver of the form are identified from an honorific or a word accompanying an addressee or a seal impression, that is, information obtained from the vicinity of a proper noun that may represent the provider or the receiver of the form. In some types of documents, however, an honorific or a word accompanying an addressee or a seal impression may not always be added to a provider or a receiver of a document. In this type of document, a determination as to whether the company of an authenticated user is a provider or a receiver of the document may be made from information obtained from a proper noun that may represent a provider or a receiver of the document. In the case of a form, too, the identity of the company of an authenticated user may be determined in this manner.

Information obtained from a proper noun that may represent a provider or a receiver of a document is, for example, attribute information concerning characters representing a proper noun. Examples of the attribute information concerning characters are the font size, font type, and underlines. A company name will be taken as an example of a proper noun that may represent a provider or a receiver of a document. Attribute information concerning characters representing a company name described on a document may be compared with that at least concerning characters located near this company name. It is then determined whether the attribute of this company name is a provider or a receiver of the document in accordance with whether the two items of attribute information are identical to or different from each other.

For instance, it is quite common for a document creator to use different font sizes in a document, such as using a larger font size for the company name of a document receiver than that for another item located near the company name. For example, a 16-point font size is used for the company name of a document receiver, while a 12-point font size is used for the other items in the document. Additionally, a document creator may underline the company name of a document receiver, while leaving the other items in the document without underlines. In this manner, if attribute information concerning characters representing a company name is different from that concerning characters located near the company name, the judger 14 determines that the attribute of this company name is a receiver of the document. It is also quite common for a document creator to use the same font size for the company name of a document provider as that for another item located near the company name. In this manner, if attribute information concerning characters representing a company name is almost the same as that concerning characters positioned near the company name, the judger 14 determines that the attribute of this company name is a provider of the document.

Instead of attribute information concerning characters representing a company name, the position of a company name on a document may be used to determine whether the attribute of the company name is a provider or a receiver of the document. For example, if the company name is positioned at or near the head of a document, the judger 14 determines that the attribute of the company name is a receiver of the document. The head of a document is a position at or near the top side of a document sheet if the document is horizontally written and is a position at or near the right side of a document sheet if the document is vertically written. That is, the head of a document is a position at or in the vicinity of which the document starts.

If the company name is positioned at or near the end of a document, the judger 14 determines that the attribute of the company name is a provider of the document. The end of a document is a position at or near the bottom side of a document sheet if the document is horizontally written and is a position at or near the left side of a document sheet if the document is vertically written. That is, the end of a document is a position at or in the vicinity of which the document finishes.

In the exemplary embodiment, in the above-described manner, it is judged whether the attribute of a company name described on a document is a provider or a receiver of the document.

If plural company names other than the company name of an authenticated user are extracted from the read image of a form, it is not possible to automatically determine which company has sent or received the form to or from the company of the authenticated user in the above-described manner. In this case, other items of information, such as the positions and the font sizes of the company names, may be checked from the read image of the form, as described above. For example, it is likely that the company name of a form receiver is located at or near the top side of the form if the form is horizontally written and that the font size for the form receiver is larger than that for another item near the form receiver. It is also likely that the company name of the form issuer is located at or near the top right or the top bottom of the form and that the font size for the form issuer is smaller than that for the form receiver. If the format of a form is analyzed in this manner, it is relatively easy to determine, among plural company names, the company having sent or received the form to or from the company of the authenticated user. More specifically, if the company of the authenticated user is an issuer of a form, the attribute of a company name positioned at or near the top side of the form is estimated to be a receiver of the form. If the company of the authenticated user is a receiver of a form, the attribute of a company name positioned at or near the right side of the form and written in a font size smaller than that of the receiver is estimated to be an issuer of the form.

The judger 14 may display plural company names extracted from the read image of a form as a list on the operation panel 5 and instruct the authenticated user to select the company that has sent or received the form to or from the company of the authenticated user.

After identifying the issuer and the receiver of a form as described above, the judger 14 generates form information by associating the form type and identification information (company name, for example) concerning each of the issuer and the receiver of this form with identification information for identifying the form (form ID, for example), and stores the generated form information in the form information storage 16. An example of the data structure of the form information stored in the form information storage 16 is shown in FIG. 6.

After identifying the issuer and the receiver of a form and generating form information as described above, the information provider 15 provides the form information to a post-process that processes the form. The information provider 15 provides the form information in any manner. For example, the form information may be sent as a file format via a network or by using a certain function, such as email. It is assumed that the form information is provided to the cloud 20. By referring to the form information, the cloud 20 is able to process the form differently depending on for who, that is, the provider or the receiver described in the form, the cloud 20 is processing the form. A specific example will be discussed below.

FIG. 7 illustrates another example of a form handled in the exemplary embodiment. The form type shown in FIG. 7 is a cost estimate. For example, for XYZ Incorporated, the cloud 20 extracts an estimate number 32 from the read image of the form and generates information. For ABC Incorporated, the cloud 20 extracts an estimate request number 33 from the read image of the form and generates information.

The cloud 20 then provides the generated items of information to the respective companies.

In this exemplary embodiment, it is possible to post-process the same form differently depending on for which company the post-process is executed, that is, depending on whether the company is an issuer or a receiver of the form. For example, different items of information may be extracted from the form. More specifically, for example, among the numbers described in the form, the number to be extracted may be different depending on whether the company is an issuer or a receiver of the form. In another example, the location where information generated from the extracted number is stored may be different depending on whether the company is an issuer or a receiver of the same form. For the issuer and the receiver of the form, different numbers may be extracted from the form, and also, information generated from the extracted number may be stored in different locations.

In many companies, forms are processed together at the end of each month, for example. In this case, forms may be scanned together and processed. As discussed above, an issuer and a receiver are both described in a form. A user to scan forms is usually a member of a company described in the forms as either an issuer or a receiver. If multiple forms at hand are continuously scanned, the company name appearing most frequently in the read images of the forms is identified as the company of this user. This will be specifically discussed below with reference to FIG. 8.

Figure 8:
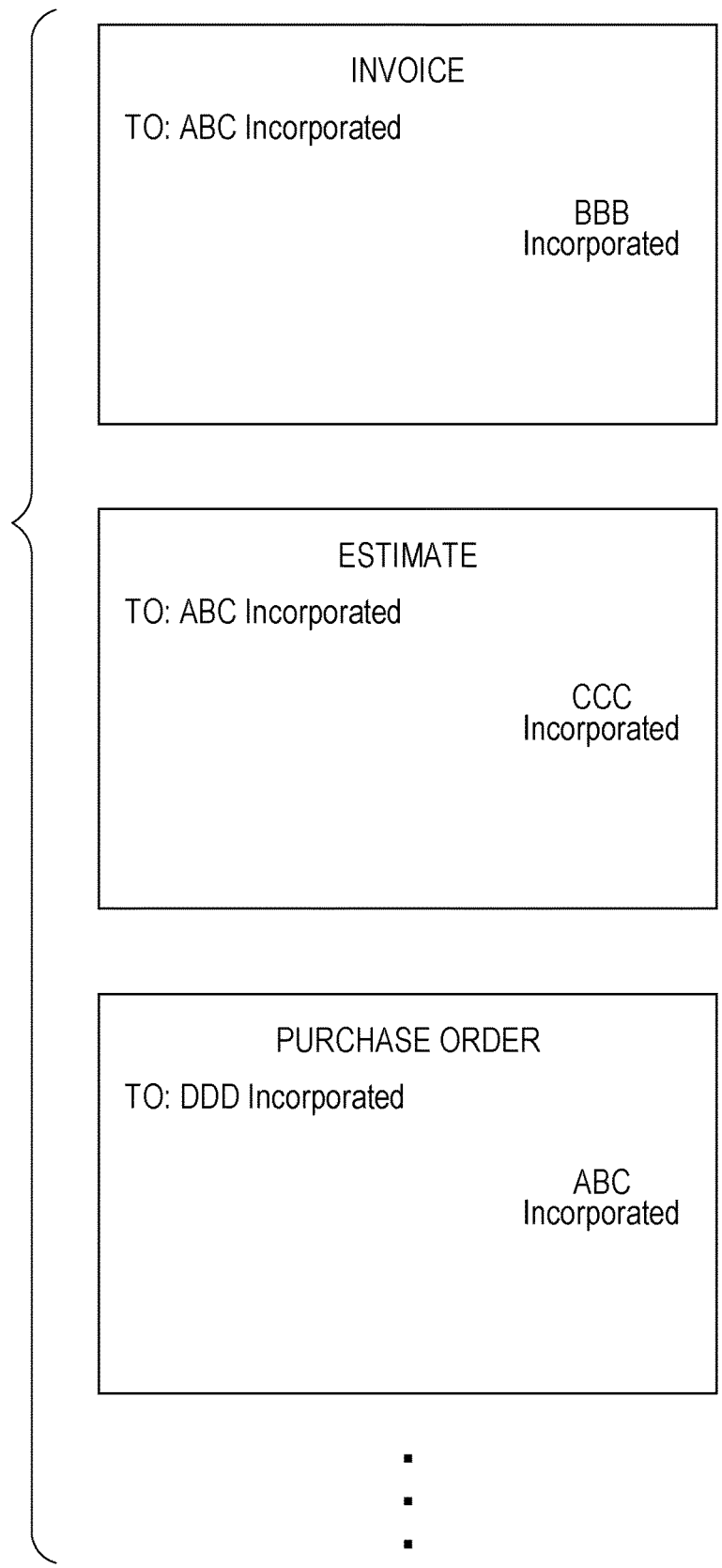
FIG. 8 illustrates examples of forms to be continuously read in the exemplary embodiment.

For example, a user A is in charge of processing forms at the end of each month in ABC Incorporated. The user A continuously reads multiple forms by using the scanner 6 of the image forming apparatus 10. Examples of the forms are shown in FIG. 8. The forms handled by the user A are forms issued by or received by ABC Incorporated. That is, each form includes the company name "ABC Incorporated" as an issuer or a receiver, as shown in FIG. 8. The judger 14 then determines that the company name most frequently appearing in the read images of the forms among the extracted company names is the company name of the user A.

Figure 4:
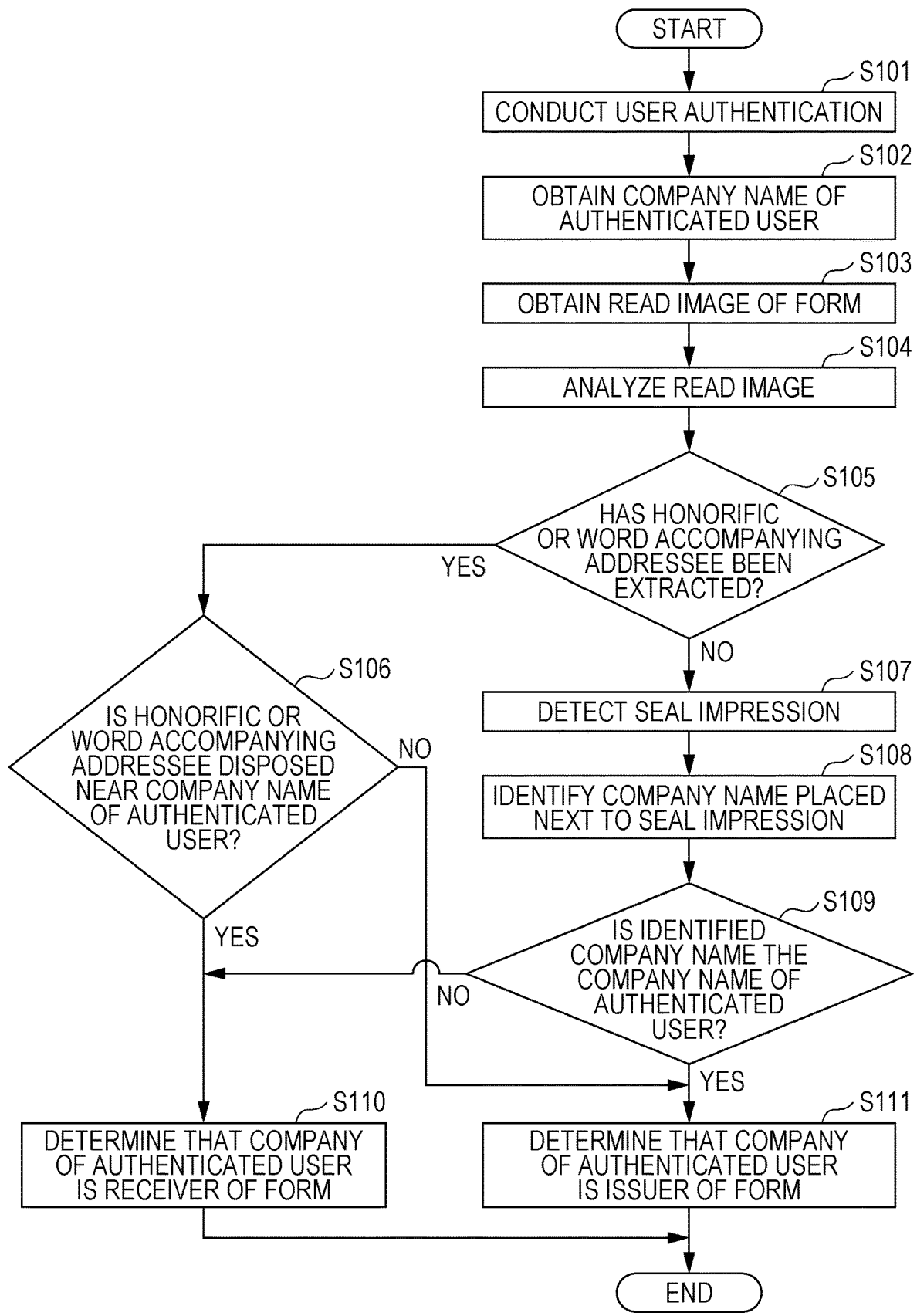
FIG. 4 is a flowchart illustrating provider/receiver determining processing in the exemplary embodiment.

In other words, even if the cloud 20 has failed to identify the company name of the user A for some reason in user authentication processing in step S101 in FIG. 4, reading multiple forms together with the scanner 6 makes it possible to identify the company name of the user A. If information concerning the user A is not yet registered in the user information database 21, the identified company name may be registered in the user information database 21 as the company of the user A.

The exemplary embodiment has been described by taking a form as an example of a document. However, any document on which a provider and a receiver for this document are described, more specifically, a document on which at least the company name of an authenticated user is described, may be used.

The exemplary embodiment has been described by assuming that the information processing apparatus according to an exemplary embodiment of the disclosure is included in the image forming apparatus 10. However, the information processing apparatus may be disposed separately from the image forming apparatus 10 if it is able to obtain the read image of a form from the image forming apparatus 10. The information processing apparatus may alternatively be implemented by the cloud 20.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor programmed to:
   extract from a document a proper noun that is likely to represent a provider of the document or a receiver of the document; and
   determine which of the provider and the receiver an attribute of the proper noun is by referring to:
   information obtained from the proper noun; or
   information obtained from a vicinity of the proper noun on the document.

2. The information processing apparatus according to claim 1, wherein the processor is programmed to:
   upon a determination that a word accompanying an addressee is added to the proper noun, determine that the attribute of the proper noun is the receiver.

3. The information processing apparatus according to claim 2, wherein the processor is programmed to:
   upon a determination that a word accompanying the addressee is added to the proper noun and a canceling mark is added to the word, determine that the attribute of the proper noun is the provider.

4. The information processing apparatus according to claim 1, wherein the processor is programmed to:
   upon a determination that a seal impression is disposed near the proper noun, determine that the attribute of the proper noun is the provider.

5. The information processing apparatus according to claim 1, wherein the information obtained from the proper noun is attribute information concerning characters representing the proper noun.

6. The information processing apparatus according to claim 5, wherein the processor is programmed to determine whether the attribute of the proper noun is the provider or the receiver of the document by determining whether the attribute information concerning the characters representing the proper noun is identical to attribute information concerning characters located near the proper noun on the document.

7. The information processing apparatus according to claim 6, wherein the processor is programmed to:
   upon a determination that the attribute information concerning the characters representing the proper noun is different from the attribute information concerning the characters located near the proper noun on the document, determine that the attribute of the proper noun is the receiver.

8. The information processing apparatus according to claim 6, wherein the processor is programmed to:
upon a determination that the attribute information concerning the characters representing the proper noun is identical to the attribute information concerning the characters located near the proper noun on the document, determine that the attribute of the proper noun is the provider.

9. The information processing apparatus according to claim 1, wherein the processor is programmed to determine whether the attribute of the proper noun is the provider or the receiver by referring to a position of the proper noun on the document.

10. The information processing apparatus according to claim 9, wherein the processor is programmed to:
upon a determination that the proper noun is positioned at or near the head of the document, determine that the attribute of the proper noun is the receiver.

11. The information processing apparatus according to claim 9, wherein the processor is programmed to:
upon a determination that the proper noun is positioned at or near an end of the document, determine that the attribute of the proper noun is a provider.

12. A non-transitory computer readable medium storing a program causing a computer to execute a process, the process comprising:
extract from a document a proper noun that is likely to represent a provider of the document or a receiver of the document;
determine which of the provider and the receiver an attribute of the proper noun is by referring to:
information obtained from the proper noun; or
information obtained from a vicinity of the proper noun on the document; and
associating the extracted proper noun and the determined attribute with each other.

13. An information processing apparatus comprising:
extracting means for extracting from a document a proper noun that is likely to represent a provider of the document or a receiver of the document;
determining means for determining which of the provider and the receiver an attribute of the proper noun is the provider or the receiver by referring to:
information obtained from the proper noun; or
information obtained from a vicinity of the proper noun on the document.

* * * * *